United States Patent
Greenberg

(12) 
(10) Patent No.: US 9,189,050 B1
(45) Date of Patent: Nov. 17, 2015

(54) METHOD AND APPARATUS FOR MEMORY POWER REDUCTION

(75) Inventor: Marc Greenberg, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 575 days.

(21) Appl. No.: 13/214,091

(22) Filed: Aug. 19, 2011

(51) Int. Cl.
  *G06F 13/18* (2006.01)
  *G06F 13/374* (2006.01)
  *G06F 1/32* (2006.01)

(52) U.S. Cl.
  CPC .............. *G06F 1/3203* (2013.01); *G06F 13/18* (2013.01)

(58) Field of Classification Search
  CPC ......... G06F 1/30; G06F 3/061; G06F 1/3203; G06F 1/3237; G06F 1/324; G06F 1/3296; G06F 1/3209
  See application file for complete search history.

(56) References Cited

U.S. PATENT DOCUMENTS

| | | | |
|---|---|---|---|
| 8,533,403 B1* | 9/2013 | Law | 711/151 |
| 8,572,322 B2* | 10/2013 | Xu et al. | 711/122 |
| 2004/0075600 A1* | 4/2004 | Vera et al. | 341/166 |
| 2004/0117791 A1* | 6/2004 | Prasad et al. | 718/100 |
| 2006/0294049 A1* | 12/2006 | Sechrest et al. | 707/1 |
| 2008/0104430 A1* | 5/2008 | Malone et al. | 713/300 |
| 2008/0235423 A1* | 9/2008 | Mace | 710/113 |
| 2010/0312944 A1* | 12/2010 | Walker | 711/5 |
| 2011/0072179 A1* | 3/2011 | Lacroute et al. | 710/244 |
| 2011/0113204 A1* | 5/2011 | Henriksson et al. | 711/154 |
| 2012/0210055 A1* | 8/2012 | Mace et al. | 711/105 |
| 2013/0031298 A1* | 1/2013 | Tan et al. | 711/103 |

\* cited by examiner

*Primary Examiner* — Cheng-Yuan Tseng
*Assistant Examiner* — Candice Rankin
(74) *Attorney, Agent, or Firm* — Sawyer Law Group, P.C.

(57) ABSTRACT

A method and system for reducing memory power usage are disclosed. The method and system comprise receiving at least one low-priority command and delaying execution of the at least one low-priority command until a predetermined event occurs, wherein the memory remains in a low-power mode until the predetermined event occurs.

11 Claims, 3 Drawing Sheets

METHOD AND APPARATUS FOR MEMORY POWER REDUCTION

FIELD OF THE INVENTION

The present invention relates generally to memory access and more particularly relates to a method and system for memory power reduction.

BACKGROUND

A system-on-a-chip (SoC) often contains multiple masters requiring dynamic random-access memory (DRAM) access. These masters may include but are not limited to the following: Central Processing Units (CPUs), Digital Signal Processing units (DSPs), Graphics Processing Units (GPUs), Network Processing Units (NPUs), Direct Memory Access (DMA) controllers, 3D graphics accelerators, networking controllers, cache controllers, and wireless modems.

In a conventional SoC, the different masters are connected to the DRAM through an on-chip interconnect and a DRAM memory controller. In SoCs of this type, there is typically a high-level power control module that can recognize if the system is in a low-power mode or in a high-power mode, and a low-level power control that can recognize gaps in intermittent traffic and activate low-power modes (e.g. standby, nap, sleep, powerdown . . . etc) during inactivity.

Another important characteristic of a SoC is that not every master in the system has the same priority level. For example, CPUs typically have the highest priority in the system and require service within a few hundreds of nanoseconds. Some other masters may be very low-priority and may be delayed arbitrarily for tens of millions of nanoseconds as long as their requests are serviced within their maximum service time.

In order to reduce DRAM power usage, the DRAM should spend as much time as possible in its low-power modes. However, the DRAM typically uses more power than is necessary by executing all commands before entering the low-power mode. Often times, this provides no performance benefit to the SoC.

Accordingly, what is desired is to provide a system and method that overcomes the above issues. The present invention addresses such a need.

SUMMARY OF THE INVENTION

A method and system for reducing memory power usage is disclosed. The method and system comprise receiving at least one low-priority command and delaying execution of the at least one low-priority command until a predetermined event occurs, wherein the memory remains in a low-power mode until the predetermined event occurs. A method and system in accordance with the present invention have the advantages of minimizing repeated entry and exit to and from low-power modes and saving power by reducing memory power usage without affecting system performance.

DETAILED DESCRIPTION OF PREFERRED EMBODIMENTS

Figure 1:
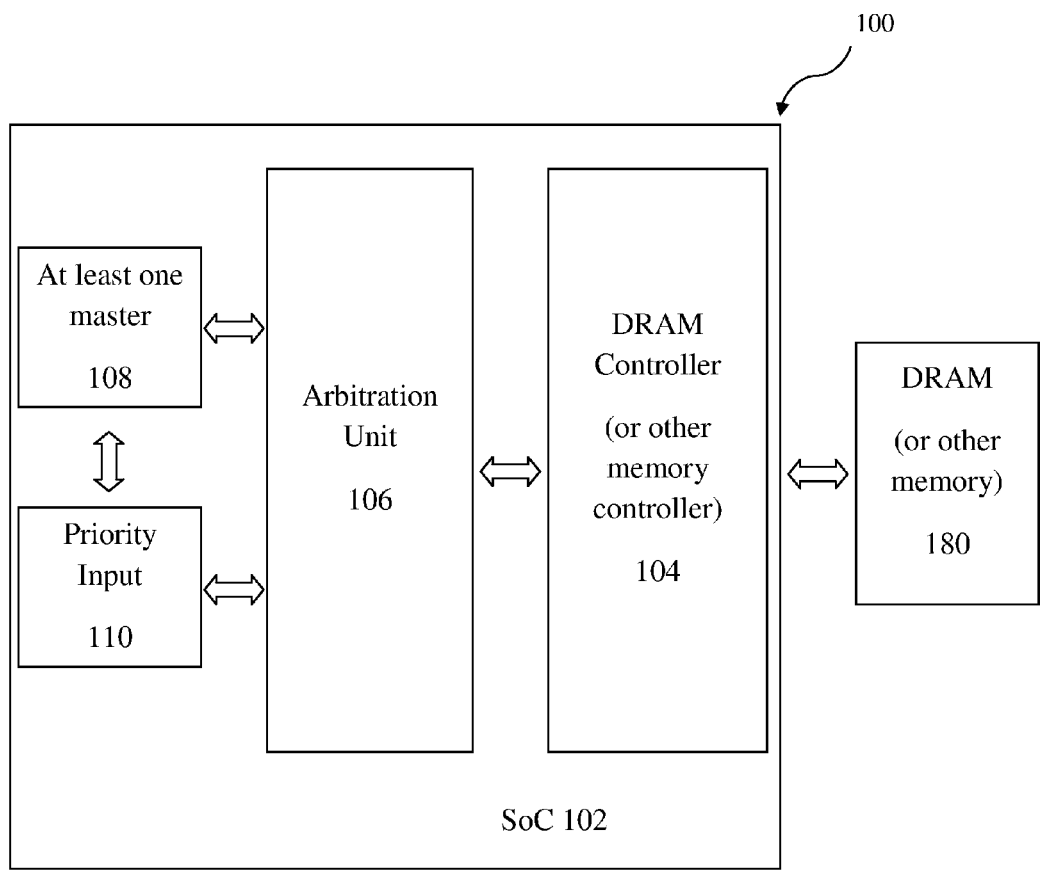
FIG. 1 illustrates a block diagram of an apparatus in accordance with an embodiment.

The present invention relates generally to memory access and more particularly relates to a method and system for memory power reduction. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method and system for reducing memory power usage are disclosed. The method and system comprise receiving at least one low-priority command and delaying execution of the at least one low-priority command until a predetermined event occurs, wherein the memory remains in a low-power mode until the predetermined event occurs. In so doing, repeated entry and exit to and from low-power modes is minimized and memory power usage is reduced without affecting system performance. To describe the features of the present invention in more detail, refer now to the following description in conjunction with the accompanying Figures.

Although aspects of the present invention will be described in the context of a dynamic random access memory (DRAM), one of ordinary skill in the art readily recognizes that the descriptions are applicable to any type of memory and that would be within the spirit and scope of the present invention. Conventional approaches for DRAM power usage have focused on heavily-loaded conditions that may include but are not limited to the following: playing 3D games, networking equipment during peak hours, device multitasking.

These conventional approaches have either followed a strict in-order execution of all commands as soon as they arrive, a priority-based arbitration that services high-priority requests before lower priority requests, a bandwidth-based arbitration that may guarantee a minimum bandwidth to certain masters along with best-effort service requests, or a maximum-latency arbitration that guarantees or makes significant best-effort attempts to service these requests within a maximum service time. However, most devices only spend a small percentage of their time in a heavily-loaded condition and spend a majority of their time in a lightly-loaded condition.

Furthermore, the low-level power control in most system-on-a-chip (SoCs) will only initiate low-power modes of the DRAM when all outstanding requests from all masters have been serviced, and when there are no outstanding commands of any priority in the system, and will typically wake the system and move out of a low-power mode whenever a new command arrives. Many SoCs will attempt to use "open-page mode" of the DRAM for masters that have memory traffic characterized by good spatial locality of access and good temporal locality of access. The open-page mode of DRAM may reduce the power associated with pre-charge/activate cycles of the DRAM characteristic of closed-page mode of the DRAM. However, if the system is not heavily-loaded, the open-page mode may consume more power than the closed-page mode.

Furthermore, these conventional approaches are limited because when the SoC is lightly-loaded, and there are only low-priority requests in the system, these low-priority requests will be executed until there are no remaining requests for the DRAM even if the SoC requirement would allow for those requests to be delayed. Similarly, if the DRAM is in a low-power mode and a new command arrives, the SoC will typically put the DRAM into high-power mode to execute a new request even if the new request has a low-priority and could be delayed. Additionally, some varieties of DRAM require calibration, refresh, or resynchronization when changing from a low-power mode to a high-power mode. These calibration, refresh, and resynchronization processes consume power.

The present invention addresses the drawbacks with these conventional approaches. FIG. 1 illustrates an apparatus 100, including a system-on-a-chip (SoC) 102, DRAM controller 104, arbitration unit 106 and DRAM 180. In the apparatus 100, the SoC 102 is coupled to the DRAM 180. In another embodiment, the DRAM 180 can be integrated within the SoC 102. In the apparatus 100, the DRAM controller 104 and arbitration unit 106 are housed within the SoC 102. In another embodiment, the arbitration unit 106 could be integrated into the DRAM controller 104 or could be a stand-alone device. In the apparatus 100, the arbitration unit 106 is coupled to at least one master 108 and a priority input 110 for the at least one master 108. In another embodiment, the arbitration unit 106 could house the at least one master 108 and the priority input 110 for the at least one master 108. The at least one master 108 includes at least one command or transaction. The arbitration unit 106 arbitrates which commands or transactions should be processed.

Unlike the conventional approaches, the arbitration unit 106 delays processing of commands or transactions until a predetermined event occurs, thereby reducing overall memory power usage. A process that reduces memory power usage in accordance with the present invention can take the form of an entirely hardware implementation, an entirely software implementation, or an implementation containing both hardware and software elements. In one implementation, this process that reduces memory power usage is implemented in software, which includes, but is not limited to, application software, firmware, resident software, microcode, etc.

Furthermore, the process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 2:
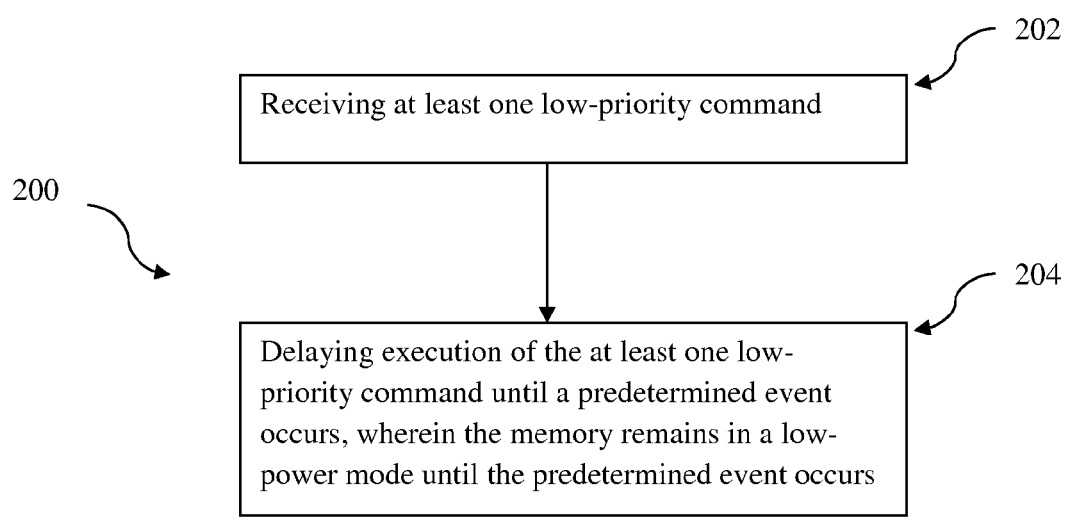
FIG. 2 illustrates a flow chart of a process in accordance with an embodiment.

FIG. 2 is a simple flow chart of a process 200 for reducing memory power usage utilizing the arbitration unit 106. The memory power usage reduction process 200 comprises first receiving at least one low-priority command, via step 202. Next, execution of the at least one low-priority command is delayed until a predetermined event occurs, wherein the memory remains in a low-power mode until the predetermined event occurs, via step 204. In so doing, memory power usage is reduced since the memory remains in low-power mode and execution of at least one low-priority command is initiated only after a predetermined event occurs rather than executing all commands before entering a low-power mode.

Figure 3:
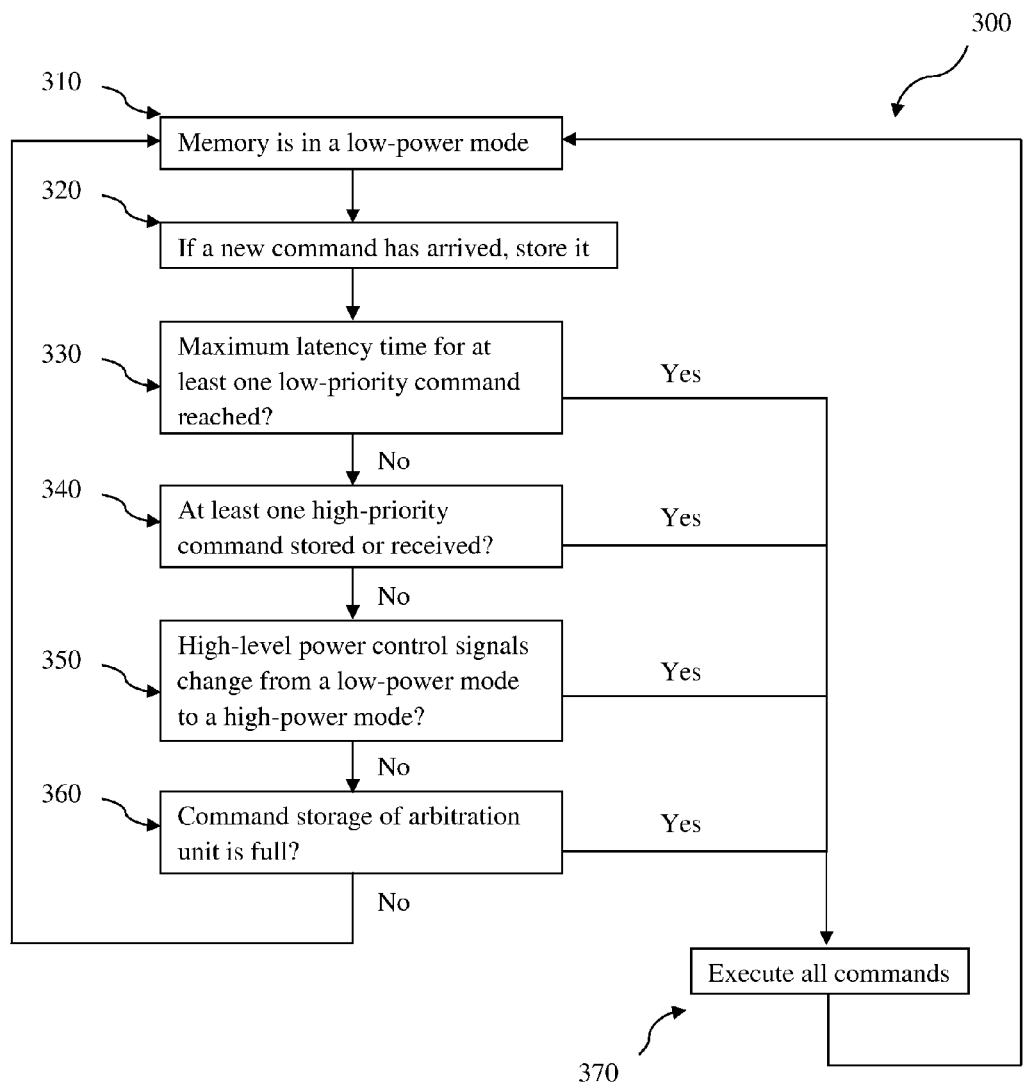
FIG. 3 illustrates a flow chart of predetermined events in accordance with an embodiment.

To describe this feature in more detail, refer now to FIG. 3 which illustrates a more detailed flow chart 300 for reducing memory power usage. In an embodiment, a memory is in a low-power mode via 310. If it is determined that a new command has arrived, the new command is stored via 320. If it is determined that a maximum latency time for at least one low-priority command has been reached via 330, then all commands are executed via 370. If the maximum latency time has not been reached, it is then determined if at least one high-priority command is stored or received via 340. If it is determined that at least one high-priority command is stored or received via 340, then all commands are executed via 370.

If at least one high-priority command is not received, it is then determined if a high-level power control signals change from a low-power mode to a high-power mode via 350. If it is determined that a high-level power control signals change from a low-power mode to a high-power mode via 350, then all commands are executed via 370. If a high-level power control does not signal change from a low-power mode to a high-power mode, it is then determined if a command storage of an arbitration unit is full via 360. If it is determined that a command storage of an arbitration unit is full via 360, then all commands are executed via 370. If a command storage of an arbitration unit is not full, the memory remains in low-power mode via 310.

Accordingly, if any one of the predetermined events 330-360 occurs, all commands will be executed via 370, and the memory will then return to a low-power mode via 310. On the other hand, if none of the predetermined events 330-360 occur, then the memory remains in a low-power mode via 310.

One of ordinary skill in the art readily recognizes that the above-identified predetermined events 330-360 can occur in any order and that would be within the spirit and scope of the present invention. The predetermined events 330-360 are not exhaustive in nature. Thus, one of ordinary skill in the art readily recognizes that there are additional predetermined events that may cause the memory to move out of a low-power mode and execute all commands. Additional predetermined events may include but are not limited to the following: at least one low-priority command increases in priority, command querying in the system is full, a watch-dog timer expires, at least one delayed command is addressed to a page in memory that is currently open, and a system level request is received to abandon low-power mode.

In another embodiment, a plurality of low-priority commands may be grouped and executed together as a batch. The power-saving advantages of batching a plurality of low-priority commands together in a lightly loaded system may include one or more of the following: reduced ZQ calibration cycles, reduced DLL relocking cycles, reduced auto-refresh commands on entering to and exiting from low-power modes, reduced pre-charge/activate cycles in the DRAM due to improved temporal locality for commands requiring open-page mode execution, and reduced time on average that pages are open in open-page mode.

As above described, by delaying the execution of low-priority commands or transactions until a predetermined event occurs, the memory remains in a low-power mode until the predetermined event occurs. Thus, repeated entry and exit to and from memory low-power modes is reduced. This reduction in repeated entry and exit to and from memory low-power modes greatly reduces memory power usage which has the advantages of saving power, reducing operation costs, and increasing memory efficiency without affecting system performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method for reducing power usage of a memory, the method comprising:
   receiving a plurality of low-priority commands associated with the memory during low-power mode;
   grouping the plurality of low-priority commands into a batch; and
   delaying execution of the batch until a predetermined event associated with the memory occurs, wherein the memory remains in the low-power mode until the predetermined event associated with the memory occurs, wherein the predetermined event occurs when a command storage of an arbitration unit is full, when a maximum latency time for the at least one low priority command is reached, the low-power mode is changed to a high-power mode by a high-level power control, a watch dog time is expired, and at least one low-priority command of the plurality of low-priority commands is addressed to an open memory page.

2. The method of claim 1, wherein the memory comprises a dynamic random access memory (DRAM).

3. The method of claim 1, wherein the plurality of low-priority commands are grouped into a plurality of batches.

4. An apparatus, the apparatus comprising:
   a memory; and
   a memory controller coupled to the memory, wherein the memory controller is adapted to receive a plurality of low-priority commands associated with the memory during low-power mode, to group the plurality of low-priority commands into a batch, and to delay execution of the batch until a predetermined event associated with the memory occurs via an arbitration unit, wherein the memory remains in the low-power mode until the predetermined event associated with the memory occurs, wherein the predetermined event occurs when a command storage of an arbitration unit is full, when a maximum latency time for the at least one low priority command is reached, the low-power mode is changed to a high-power mode by a high-level power control, a watch dog time is expired, and at least one low-priority command of the plurality of low-priority commands is addressed to an open memory page.

5. The apparatus of claim 4, wherein the memory comprises a dynamic random access memory (DRAM).

6. The apparatus of claim 4, wherein the plurality of low-priority commands are grouped into a plurality of batches.

7. An arbitration unit, the arbitration unit comprising:
   at least one master, wherein the at least one master includes a plurality of low-priority commands during low-power mode;
   a priority input for the at least one master; and
   a mechanism for grouping the plurality of low-priority commands into a batch and for delaying execution of the batch until a predetermined event occurs, wherein a memory associated with the arbitration unit remains in the low-power mode until the predetermined event occurs, wherein the predetermined event occurs when a command storage of an arbitration unit is full, when a maximum latency time for the at least one low priority command is reached, the low-power mode is changed to a high-power mode by a high-level power control, a watch dog time is expired, and at least one low-priority command of the plurality of low-priority commands is addressed to an open memory page.

8. The arbitration unit of claim 7, wherein the memory comprises a dynamic random access memory (DRAM).

9. The arbitration unit of claim 7, wherein the plurality of low-priority commands are grouped into a plurality of batches.

10. A non-transitory computer readable medium containing program instructions for reducing power usage of a memory, wherein execution of program instructions by one or more processors of a computer causes the one or more processors to carry out the steps of:
    receiving a plurality of low-priority commands associated with the memory during low-power mode;
    grouping the plurality of low-priority commands into a batch; and
    delaying execution of the batch until a predetermined event associated with the memory occurs, wherein the memory remains in the low-power mode until the predetermined event associated with the memory occurs, wherein the predetermined event occurs when a command storage of an arbitration unit is full, when a maximum latency time for the at least one low priority command is reached, the low-power mode is changed to a high-power mode by a high-level power control, a watch dog time is expired, and at least one low-priority command of the plurality of low-priority commands is addressed to an open memory page.

11. The non-transitory computer readable medium of claim 10, wherein the plurality of low-priority commands are grouped into a plurality of batches.

* * * * *